United States Patent
Martelli et al.

(10) Patent No.: US 7,074,306 B2
(45) Date of Patent: Jul. 11, 2006

(54) ELECTROCATALYTIC COMPOSITION FOR OXYGEN-DEPOLARIZED CATHODE

(75) Inventors: Gian Nicola Martelli, Vimodrone (IT); Fulvio Federico, Piacenza (IT)

(73) Assignee: De Nora Electtrodi S.p.A. (IT)

( * ) Notice: Subject to any disclaimer, the term of this patent is extended or adjusted under 35 U.S.C. 154(b) by 571 days.

(21) Appl. No.: 10/466,730

(22) PCT Filed: Feb. 28, 2002

(86) PCT No.: PCT/EP02/02205

§ 371 (c)(1),
(2), (4) Date: Jul. 17, 2003

(87) PCT Pub. No.: WO02/068722

PCT Pub. Date: Sep. 6, 2002

(65) Prior Publication Data

US 2004/0069622 A1    Apr. 15, 2004

(30) Foreign Application Priority Data

Feb. 28, 2001  (IT) .......................... MI2001A0402

(51) Int. Cl.
*C25D 17/12* (2006.01)

(52) U.S. Cl. .............. 204/283; 204/290.1; 204/290.14; 204/291; 204/252; 204/253; 204/257; 205/618; 205/620; 205/621; 205/625

(58) Field of Classification Search ................ 204/283, 204/290.1, 290.14, 291, 252, 253, 257; 205/618, 205/620, 621, 625; 502/101
See application file for complete search history.

(56) References Cited

U.S. PATENT DOCUMENTS

| 4,082,651 A |   | 4/1978  | Antos |
|-------------|---|---------|-------|
| 6,010,606 A | * | 1/2000  | Denton et al. ............... 204/284 |
| 6,149,782 A | * | 11/2000 | Allen et al. ............. 204/290.14 |
| 6,358,381 B1 | * | 3/2002 | Allen et al. .................. 204/283 |
| 6,402,930 B1 | * | 6/2002 | Allen et al. .................. 205/625 |
| 6,855,660 B1 | * | 2/2005 | Tsou et al. ................. 502/216 |
| 2003/0086862 A1 | * | 5/2003 | Tsou et al. ................ 423/561.1 |
| 2004/0069621 A1 | * | 4/2004 | Gestermann et al. ........ 204/266 |

* cited by examiner

*Primary Examiner*—Bruce F. Bell
(74) *Attorney, Agent, or Firm*—Charles A. Muserlian

(57) ABSTRACT

An oxygen-depolarized cathode for aqueous hydrochloric acid electrolysis membrane cells is described, the cathode being in contact with the membrane and capable of preventing the release of hydrogen into oxygen even at the highest current densities. Hydrochloric acid may also be of technical grade with a concentration limited to 15%, whereas the operating temperature must not exceed 60° C. The cathode contains a mixture of rhodium sulphide and a metal of the platinum group applied in a single layer or alternatively applied separately in two distinct layers.

22 Claims, 1 Drawing Sheet

ELECTROCATALYTIC COMPOSITION FOR OXYGEN-DEPOLARIZED CATHODE

This application is a 371 of PCT/EP02/02205 filed Feb. 28, 2002.

DESCRIPTION OF THE INVENTION

The present invention relates to a new electrocatalytic composition for oxygen depolarised cathode.

Many important industrial processes generate hydrochloric acid as a by-product: among them some of the most relevant ones are the synthesis of vinyl chloride, which is polymerised to polyvinylchlorde (known as PVC), and the synthesis of isocyanates which are reacted with various types of glycoles to produce polyurethanes, widely used for cellular foams and for high-quality paints. Since both for PVC and polyurethanes a constant increase of production is foreseen in the coming years, it is easy to envisage that the market will not be able to absorb the increasing amounts of hydrochloric acid made available in this way (among the most important uses of hydrochloric acid it is worthwhile to mention its use in the field of metallurgy for the pickling of plates and tubes, and in the field of oil-well drilling). To overcome these problems, made worse also by the increasing transport difficulties, some manufacturing plants of isocyanate convey the by-product acid to nearby vinyl chloride production plants, which are equipped with oxychlorination units capable of converting a mixture of acid, ethylene and oxygen into dichloroethane, then on its turn transformed into vinyl chloride. However, this solution is far from being satisfactory since it actually makes the isocyanate plant slave to the vinyl chloride production plant (same shut-downs for planned and unplanned maintenance, rates of production imposed by the PVC market whose cycles do not certainly coincide with those of polyurethanes). Within this picture the electrolysis of hydrochloric acid with subsequent chlorine recycling is much more interesting than in the past: this technology has been known for some time in a version known as Hoechst-Bayer-Uhde process applied to a certain number of industrial plants. The energy consumption, equivalent to 1500 kWh/ton of chlorine with current density of 4 kA/m², is anyway considered too high to be economically interesting, also in view of the capital investments. These in fact are particularly heavy, because the construction material for the electrolysers is graphite or a graphite-polymeric binder composite in the form of plates.

With the object of decreasing energy consumptions a proposal was made (General Electric Co.) to replace the cathode for hydrogen evolution used in the Hoechst-Bayer-Uhde technology with an oxygen-consuming cathode, hereafter defined as depolarised oxygen cathode. The advantage achieved by this replacement consists in the lower voltage of the cell, which corresponds to a decrease in energy consumption down to 1000–1100 kW/ton of chlorine, a value making possible a wide industrial application. The other barrier, represented by the high investments required by graphite-based materials, can be considered overcome by the electrolysis cell design incorporating a depolarised cathode which can be completely built in titanium or a titanium alloy as proposed in U.S. Pat. No. 5,770,035.

The oxygen-depolarised cathode, in its most effective embodiment, is constituted by a porous substrate of carbon or carbon fibre, e.g. TGH Toray or PWB-3 Zoitek, coated on one surface with a mixture of hydrophobic carbon powder, e.g. acetylene black, and an inert polymeric binder such as polytetrafluoroethylene (PTFE). On this layer a further layer is then applied made of a mixture of catalytic powder and inert binder, such as PTFE or ionomeric polymer, e.g. Nafion® commercialised by DuPont De Nemours Co. The catalytic powder on its turn is constituted by catalyst particles or better by catalyst dispersed and supported on carbon particles such as Vulcan XC-72. The most known and most active catalysts for oxygen reduction are metals of the platinum group, and particularly platinum per se, which actually is extensively used for the manufacture of oxygen cathodes for fuel cells.

However, when depolarised cathodes containing known catalysts are installed in electrolysis cells of hydrochloric acid of technical grade, namely containing the unavoidable impurities that dissolve during the manufacturing process, two severe problems must be faced, that is the corrosion of platinum or an equivalent metal during shut-downs and the progressive loss of activity caused by the absorption of impurities on the surface of the catalytic particles.

The first problem, that of corrosion, can be solved by replacing oxygen with nitrogen during shut-downs and by keeping the cells under a protective current: it is obvious that said measures complicate the plant operation and are not favourably accepted by the operators. Moreover it is also obvious that in case of emergency stops the above mentioned procedures cannot be applied, thus involving the catalyst deterioration.

Both problems are solved to the root by the new type of catalyst described in U.S. Pat. No. 6,149,782. This catalyst, consisting of a probably non stoichiometric rhodium and sulphur compound ($RhS_x$), hereinafter defined for simplicity rhodium sulphide, is obtained as described in Example 1 of U.S. Pat. No. 6,149,782 by precipitation from a solution containing a soluble compound of rhodium with hydrogen sulphide on carbon powder, such as Vulcan XC-72, followed by a thermal treatment. Rhodium sulphide thus obtained is intrinsically resistant to corrosion during planned or emergency shut-downs and therefore does not require the application of the above described procedures (replacement of oxygen with nitrogen, use of protection currents). Furthermore rhodium sulphide keeps its catalytic activity unchanged even in presence of the impurities commonly contained in the technical grade acid: this favourable behaviour is probably due to the specific electronic structure of the catalyst and to the resulting reduced energy of adsorption of the impurities which allows to maintain catalytic sites substantially available for the reaction of oxygen reduction.

However, when the electrolysis cells of hydrochloric acid are operated at current densities exceeding 3 kA/m², e.g. in the range of 4–6 kA/m² as required to reduce capital investments, the formation of hydrogen is noticed, which mixes with the oxygen feed. In particular it has been noticed that the quantity of hydrogen increases with the increase of the current density: this fact forces to limit the operation of electrolysis plants to relatively moderate current densities in order to avoid that hydrogen contained in oxygen may reach the explosion limits.

From what stated above, it may be concluded that, while the problems of corrosion and loss of catalytic activity due to impurities are substantially solved with the use of rhodium sulphide as catalyst for depolarised cathodes, further improvements are necessary to solve the problem of hydrogen formation in order to allow the electrolysis plants to work at high current densities with reduction of capital investments.

The present invention has the object of improving the electrolysis of technical hydrochloric acid and it particularly allows to solve the problem of hydrogen formation which unfavourably affects the oxygen-depolarised cathodes known in the existing technology: this result is achieved by the use of oxygen-depolarised cathodes containing rhodium sulphide and a metal of the platinum group, preferably platinum itself, as the catalyst. Platinum can be mixed in the catalytic layer with rhodium sulphide in a homogeneous way or alternatively it can be applied as an additional layer interposed between the hydrophobic layer and the catalytic layer or more generally as an additional layer localised on the surface of the depolarised cathode opposite to the surface on which rhodium sulphide is present.

FIG. 2 shows a comparison between the polarisation curves obtained, under comparable conditions, from two cells equipped with oxygen-depolarised cathode based on rhodium sulphide as such and added with 5% platinum.

Figure 1:
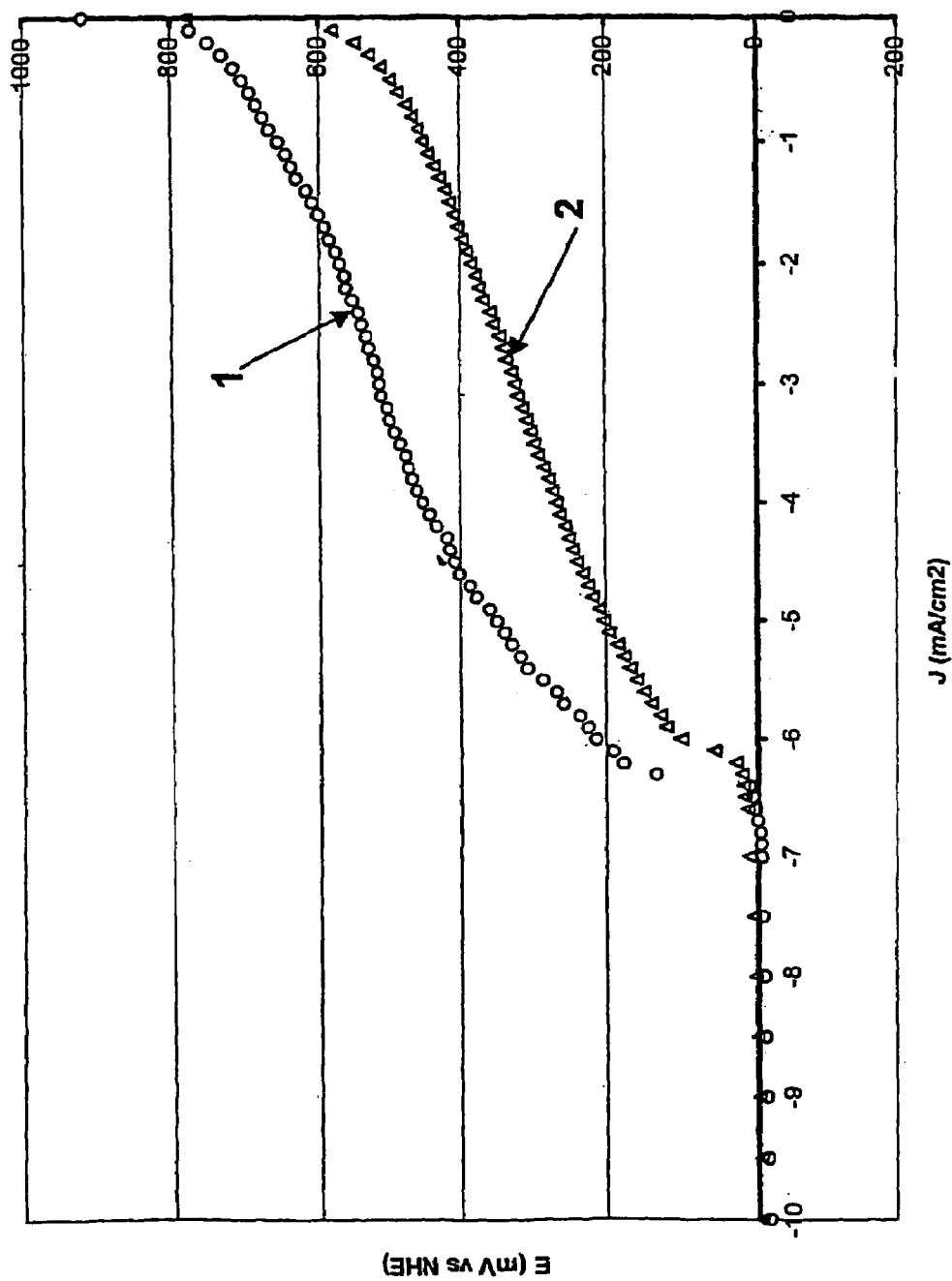
FIG. 1 represents the potential/current density relationships for an oxygen-depolarised cathode in contact with 0.5 molar sulphuric acid or 1 molar hydrochloric acid, respectively, at 50° C.

In particular, in FIG. 1 reference (1) indicates the polarisation curve for a Pt cathode under intentiodynamic conditions, in 0.5 molar sulphuric acid; (2) indicates the polarisation curve, still under intentiodynamic conditions, of the same cathode in 1 molar hydrochloric acid.

FIG. 2 shows the cell voltage/current density relationships for two similar cells equipped with depolarised cathodes containing (3) rhodium sulphide and (4) rhodium sulphide +5% platinum respectively and fed with hydrochloric acid at controlled concentration below 15% (12–14%) at 50° C. and pure oxygen at 1 atm.

The experimental data reported below are intended to be obtained with a cell (equipped with a ion exchange membrane, in particular a Nafion®324 membrane) of the type described in the already mentioned U.S. Pat. No. 5,770,035.

When such an electrolysis cell of technical grade hydrochloric acid equipped with an oxygen-depolarised cathode containing rhodium sulphide and fed with pure oxygen at 1 atm is operated at high current densities, indicatively exceeding 3 kA/m$^2$, the formation of hydrogen which mixes with oxygen is noticed. Hydrogen appears at cell voltages indicatively above 1.45 volts and its quantity is increasing as the current density increases, as it is clearly proved by the data collected in table 1.

TABLE 1

| HCl technical grade, 12–14%, 60° C. | | |
|---|---|---|
| Current density (kA/m$^2$) | Cell voltage (V) | H$_2$ Content (ppm) |
| 3 | 1.22 | 0 |
| 4 | 1.35 | 0 |
| 5 | 1.48 | 100 |
| 5.5 | 1.56 | 400 |
| 6 | 1.62 | 1000 |

The data reported in table 1 have been obtained with a cell in which the oxygen-depolarised cathode, containing 30% rhodium sulphide on Vulcan XC-72 active carbon, prepared according to what described in Example 1 of U.S. Pat. No. 6,149,782, for a total of 1 mg/cm$^2$ of rhodium given as metal, is in contact with the ion exchange membrane Nafion® 324, whereas the anode consists of a titanium expanded mesh coated with an electrocatalytic film of ruthenium dioxide and is kept 2 mm spaced apart from the membrane itself. The cell is fed with hydrochloric acid whose concentration is maintained below 15% (12–14%) at 60° C.

The reason for this behaviour is probably due to the negative effect of chlorides on the kinetics of oxygen reduction, as shown in FIG. 1. This figure reports the potential/current density relationship for a platinum foil cathode immersed in a first case in a 0.5 molar sulphuric acid solution and in a second case in a 1 molar hydrochloric acid solution, at 55° C. under 1 atm pure oxygen bubbling. In the figure, the current values reported have negative sign, according to the common convention attributing this sign to the cathodic currents. As it can be easily observed, under the same operating conditions (total acidity, temperature, pressure) the replacement of sulphate ions with chloride ions considerably depresses the kinetics of oxygen reduction: in fact, at the same current densities, the overvoltage is substantially higher, and in particular potentials appear sensibly shifted to the cathodic direction. More in particular, at high current densities the potentials for oxygen reduction fall within the range of hydrogen evolution (approximately $\leq 0$ Volt NHE). At the same current densities in sulphuric acid the kinetics of oxygen reduction are much more efficient and the corresponding potentials remain in a range clearly above the region of hydrogen evolution. The data of FIG. 1 have been obtained in a laboratory cell with three electrodes, the working electrode (in this case the platinum sheet), the reference electrode and the counter-electrode respectively: as it is known to people skilled in the art, this type of cell allows to detect directly the electrochemical potential of the operating electrode as a function of the current density and not only the cell global voltage, which is the only measurable value with electrolysis cells of the type described in U.S. Pat. No. 5,770,035.

The behaviour of FIG. 1 is substantially repeated when the platinum sheet is replaced by a graphite plate coated with a mixture of rhodium sulphide and PTFE sintered at 350° C. according to the procedure described in Example 3 of U.S. Pat. No. 6,149,782. Rhodium sulphide is prepared as described in Example 1 of the same reference, in particular with a final thermal treatment at 630° C. in inert atmosphere.

It has now been found by the inventors that an oxygen-depolarised cathode, in which the catalyst included in the electrocatalytic layer comprises at the same time the rhodium sulphide of the reference U.S. Pat. No. 6,149,782 and a metal of the platinum group, is surprisingly capable of working minimising the release of hydrogen into oxygen even at high current densities, e.g. in the range of 4–6 kA/m$^2$, when it is installed in an electrolysis cell fed with technical grade hydrochloric acid. In particular the metal of the platinum group is platinum itself. Rhodium sulphide is preferably present as nanoparticles, with an average size of 10–100 nanometers supported at 30% by weight on active carbon, e.g. Vulcan XC-72; platinum too is preferably supported on active carbon and its particles can have the same average size as indicated for rhodium sulphide, or preferably greater size (200–500 nm), which represents the best compromise between the catalytic activity and the chemical stability. The total load of rhodium, expressed as metal, and platinum, can be approximately fixed around 1 mg/cm$^2$. However the total load can be largely smaller, however values below 0.5 mg/cm$^2$ are not particularly preferred considering the lower catalytic activity, which results in higher cell voltages (greater consumption of electric power), and values exceeding 1 mg/cm$^2$ do not seem to have a real industrial interest since the marginal gains in cell voltage cannot counterbalance the higher costs of the noble metals.

In a first embodiment rhodium sulphide and platinum supported on active carbon are separately prepared and then mechanically mixed. The mixture thus obtained is used together with an appropriate inert polymeric binder such as PTFE or Nafion® to apply the catalytic layer of the oxygen-depolarised cathode.

Table 2 reports the data concerning the hydrogen content in oxygen obtained with an electrolysis cell fed with technical grade hydrochloric acid 12–14% by weight equipped with an oxygen-depolarised cathode containing rhodium sulphide in the catalytic layer supported at 30% on Vulcan XC-72 active carbon for a total of 1 mg/cm$^2$ of rhodium calculated as metal and platinum supported at 30% still on Vulcan XC-72 in the proportion of 1–5–10–20% by weight versus the rhodium load. The cell is operated at 55° C. and fed with pure oxygen at 1 atm regulated in a way to ensure a 20% excess as opposed to the stoichiometric quantity required by each current density.

TABLE 2

HCl technical grade, 12–14%, 60° C.
Depolarised cathode containing RhS$_x$ and Pt in mixture as catalysts

| Current density (kA/m$^2$) | 1% Pt | | 5% Pt | | 10% Pt | | 20% Pt | |
|---|---|---|---|---|---|---|---|---|
| | Cell V (V) | Conc. H$_2$ ppm | Cell V (V) | Conc. H$_2$ ppm | Cell V (V) | Conc. H$_2$ ppm | Cell V (V) | Conc. H$_2$ ppm |
| 5 | 1.46 | 100 | 1.47 | 80 | 1.46 | 50 | 1.45 | 50 |
| 5.5 | 1.55 | 380–400 | 1.56 | 200 | 1.56 | 100 | 1.55 | 100 |
| 6 | 1.60 | 1000–1200 | 1.60 | 600 | 1.60 | 200–400 | 1.59 | 200–400 |

The inventors also noticed that depolarised cathodes containing rhodium sulphide and platinum as catalyst maintain the property of preventing the release of hydrogen into oxygen independently of the quality of the acid fed to the electrolytic cell, be it pure acid (RP grade) or acid of technical grade, containing Impurities of inorganic type such as metal ions or organic type such as for instance chlorinated compounds of different molecular weight according to the type of plant from which it is released. It was also assessed that the presence of platinum in the catalytic layer does not significantly affect the performance of depolarised cathodes and therefore of the cells where they are installed, at least in the range of the explored platinum percentages (1–20% referred to rhodium content), as it is proved from the data graphically reported in FIG. 2.

It was also found that a second alternative of construction of the cathode of the present invention is equally effective: according to this second alternative platinum supported on active carbon is not mixed with rhodium, supported as well on active carbon, as previously described, but it is on the contrary used together with an inert polymeric binder to form an intermediate layer which is interposed between the hydrophobic layer and the catalytic layer. The layer based on platinum alone can also be applied on the cathode surface opposite to the one on which the catalytic layer containing rhodium sulphide is deposited ("external layer").

The oxygen-depolarised cathode provided with rhodium sulphide and platinum divided into two distinct layers, as described above, shows the same capacity of preventing the release of hydrogen into oxygen typical of the depolarised cathode containing mixed rhodium sulphide and platinum applied in a single layer (see table 2) and the same electrochemical properties (see FIG. 2). A particularly preferred composition, but not limiting the present invention, is the one that envisages a load of rhodium sulphide in the catalytic layer in contact with the ion exchange membrane equivalent to 1 mg/cm$^2$ calculated as metal rhodium and a load of platinum in the intermediate layer or in the external layer equivalent to 0.2 mg/cm$^2$.

The inventors also found that the oxygen-depolarised cathode containing rhodium sulphide and platinum, independently of the structure adopted—a single layer structure with mixed rhodium sulphide and platinum or a double-layer structure containing rhodium sulphide and platinum in separate layers—is practically unaffected by shut-downs even if performed without special protective measures, such as the replacement of oxygen with nitrogen and the application of protection currents.

This feature is actually rather surprising, particularly considering the rapid loss of catalytic activity of the oxygen-depolarised cathodes based an platinum alone as a consequence of shut-downs of the electrolysis cells, as known from the above mentioned technical literature. This loss of catalytic activity has been associated with the dissolution of the platinum particles which are in immediate contact with the ion exchange membrane and which constitute the essential sites on which the major part of the reaction of oxygen reduction occurs.

More in particular it was assessed that the depolarised cathodes of the invention are subject to a release of platinum during the first 3–5 shut-downs of the cells in which they are installed when said cathodes are of the single-layer type containing rhodium sulphide and platinum in mixture.

These releases practically disappear in the subsequent shut-downs. In any case the feature of preventing the release of hydrogen into oxygen remains, as already stated, totally unchanged. On the contrary, the cathodes of the invention realised according to the alternative of the two layers containing separate rhodium sulphide and platinum (platinum in the intermediate or external layer, rhodium sulphide in the catalytic layer) are not subject to release. Data referred to the platinum release are reported in table 3 for three oxygen-depolarised cathodes: one of conventional type containing platinum alone and two representing respectively the first embodiment of the invention with a single layer containing rhodium sulphide and platinum in mixture and of the second embodiment of the invention with two layers containing rhodium sulphide and platinum in separate layers, in particular with platinum in the intermediate layer. The three cathodes were installed in a cell of the type described in the reference U.S. Pat. No. 5,770,035, fed with pure oxygen at 1 atm and with 12–14% by weight hydrochloric acid of technical grade at 60° C.

TABLE 3

HCl technical grade, 12–14% by weight, 60° C.
Oxygen-depolarised cathode containing RhS$_x$ and Pt
as catalysts in mixture or separate layers
Release of Pt (percentage lost for each shut-down
versus the initial quantity)

| | Rh/Pt In mixture (Rh and Pt with particles | Rh/Pt In mixture (Pt with particles | Rh and Pt in two distinct layers (Pt with particles having |

| Sequence of shut-downs | Conventional Pt | having the same diameter: 10–100 nm) | having greater diameter: 200–500 nm) | greater diameter: 200–500 nm) |
|---|---|---|---|---|
| 1 | 30 | 25 | 15 | 1–5 |
| 2 | 10–20 | 10 | 5–10 | <1 |
| 3 | 10–20 | 10 | 5–10 | <1 |

Not limiting at all the scope of the invention it can be assumed that in the oxygen-depolarised cathode of the invention realised according to the first alternative, namely containing mixed rhodium sulphide and platinum in a single layer, during shut-downs performed without special precautions, the diffusion of chlorine and hydrochloric acid from the anodic compartment through the ion exchange membrane determines the corrosion of the platinum particles in contact with the membrane and localised in the immediate vicinity, but it does not involve platinum contained in the layer core.

The catalytic activity is not affected, being essentially supplied by the rhodium sulphide particles in immediate contact with the membrane which are not subjected to corrosion. On the contrary in the case of conventional cathodes containing platinum alone, the corrosion of particles in contact with the membrane eliminates the catalytic sites on which the oxygen reduction occurs with a consequent sudden decrease of the catalytic activity (increase of the cell voltage). In any case the invention has even greater efficacy when the platinum particles mixed with rhodium sulphide have an average size considerably greater (in the order of hundreds of nanometers instead of tens). In this way, the platinum activity is reduced by a negligible factor, but its stability to dissolution is remarkably enhanced.

If the cathodes of the invention are produced according to the second embodiment, that is with rhodium sulphide and platinum separate in two distinct layers, and particularly with platinum contained in the intermediate layer or in the external one, the situation is similar to that of the cathodes produced according to the first embodiment after they have been submitted to a certain number of shut-downs (residual platinum present only at a certain distance from the membrane). With this type of platinum distribution (only present in the intermediate layer or in the external layer) chlorine and hydrochloric acid diffusing through the membrane are diluted in the catalytic mass and are no longer capable of producing a significant corrosive attack.

With no intention to relate the present invention to any particular theory, it can be assumed that the specific action of platinum in preventing the release of hydrogen into oxygen may be ascribed to the facility with which hydrogen, present together with oxygen in the pores of the cathode structure where it is inevitably generated at the highest current densities (see FIG. 1), adsorbs on the metal dissociating into adsorbed atomic hydrogen, which unlike molecular hydrogen is extremely reactive to oxygen.

In other words platinum, acting as a catalyst for the hydrogen-oxygen recombination to give water, actually blocks hydrogen which diffuses in the pores thus preventing its release into oxygen. This mechanism is apparently confirmed by the effectiveness shown by other metals of the platinum group, and particularly iridium and palladium (also known as active catalysts of the hydrogen/oxygen reaction), when they are added to rhodium sulphide according to the two illustrated alternatives.

The invention claimed is:

1. An oxygen depolarized cathode for hydrochloric acid electrolysis membrane cells, comprising an inert electrically conductive substrate and a set of catalysts, said set comprising rhodium sulfide and at least one metal of the platinum group.

2. The cathode of claim 1 comprising at least one hydrophobic layer interposed between the substrate and said set of catalysts.

3. The cathode of claim 2 wherein said rhodium sulfide and said at least one metal of the platinum group are supported on active carbon.

4. The cathode of claim 2 wherein said rhodium sulfide and said at least one metal of the platinum group are contained in distinct catalytic layers, and the catalytic layer containing platinum is interposed between the catalytic layer containing rhodium sulfide and said hydrophobic layer.

5. The cathode of claim 1 wherein said rhodium sulfide and said at least one metal of the platinum group are supported on active carbon.

6. The cathode of claim 1 wherein said rhodium sulfide and said at least one metal of the platinum group are mixed in a catalytic layer.

7. The cathode of claim 1 wherein said rhodium sulfide and said at least one metal of the platinum group are contained in distinct catalytic layers, and the catalytic layer containing platinum is interposed between the catalytic layer containing rhodium sulfide and the substrate.

8. The cathode of claim 1 wherein said rhodium sulfide and said at least one metal of the platinum group are contained in distinct catalytic layers, applied on opposite surfaces of the substrate.

9. The cathode of claim 8, comprising at least one hydrophobic layer interposed between the substrate and said catalytic layer containing rhodium sulfide.

10. The cathode of claim 1 wherein at least one of the catalytic layers comprises an inert polymeric binder.

11. The cathode of claim 1 wherein said at least one metal of the platinum group is selected from the group comprising platinum, iridium and palladium.

12. The cathode of claim 1 wherein particles of said rhodium sulfide have an average size ranging within 10 and 100 nanometers.

13. The cathode of claim 1 wherein particles of said at least one metal of the platinum group have an average size ranging within 200 and 500 nanometers.

14. The cathode of claim 1 wherein the load of said rhodium sulfide ranges within 0.5 and 1 mg/cm$^2$ calculated as metal.

15. The cathode of claim 1 wherein said at least one metal of the platinum group is contained in an amount of 1 and 20% by weight of the load of said rhodium sulfide.

16. A hydrochloric acid electrolysis cell divided by at least one ion exchange membrane in at least one cathodic compartment and at least one anodic compartment said at least one anodic compartment comprising connections for feeding of aqueous hydrochloric acid and withdrawal of residual acid and of chlorine, said at least one cathodic compartment comprising connections for feeding of oxygen or an oxygen-containing gas and for withdrawal of residual oxygen and reaction water, wherein at least one cathodic compartment comprises at least one cathode of claim 1.

17. A process of aqueous hydrochloric acid electrolysis wherein a cell of claim 16 is fed with aqueous hydrochloric acid into said anodic compartment, and with oxygen or an oxygen-containing gas into said cathodic compartment, imposing electric current and withdrawing residual acid and chlorine from said anodic compartment, and residual oxygen and water from said cathodic compartment.

18. The process of claim 17 wherein the density of said electric current ranges between 3 and 6 kA/m$^2$.

19. The process of claim 17 wherein said hydrochloric acid is hydrochloric acid of technical grade containing impurities.

20. The process of claim 17 wherein said hydrochloric acid has a concentration not exceeding 15%.

21. The process of claim 17 wherein the operating temperature does not exceed 60° C.

22. The process of claim 17 wherein said residual oxygen extracted from said cathodic compartment is substantially free of hydrogen.

* * * * *